US012665823B2

(12) United States Patent
Mathies et al.

(10) Patent No.: US 12,665,823 B2
(45) Date of Patent: Jun. 23, 2026

(54) EFFICIENT ANOMALY WORKFLOW DETECTION FOR END-TO-END PROVISIONING SYSTEMS

(71) Applicant: T-Mobile Innovations LLC, Overland Park, KS (US)

(72) Inventors: Brandon Mathies, Frisco, TX (US); Joseph Santor, Renton, WA (US); Nathan Smith, Eureka, MO (US)

(73) Assignee: T-Mobile Innovations LLC, Overland Park, KS (US)

( * ) Notice: Subject to any disclaimer, the term of this patent is extended or adjusted under 35 U.S.C. 154(b) by 51 days.

(21) Appl. No.: 18/773,553

(22) Filed: Jul. 15, 2024

(65) Prior Publication Data

US 2026/0019349 A1    Jan. 15, 2026

(51) Int. Cl.
| | |
|---|---|
| *H04L 41/5051* | (2022.01) |
| *H04L 41/0806* | (2022.01) |
| *H04L 41/142* | (2022.01) |
| *H04L 41/16* | (2022.01) |
| *H04L 43/04* | (2022.01) |
| *H04L 43/091* | (2022.01) |

(52) U.S. Cl.
CPC ...... *H04L 41/5051* (2013.01); *H04L 41/0806* (2013.01); *H04L 41/142* (2013.01); *H04L 41/16* (2013.01); *H04L 43/04* (2013.01); *H04L 43/091* (2022.05)

(58) Field of Classification Search
CPC ............ H04L 41/5051; H04L 41/0806; H04L 41/142; H04L 41/16; H04L 43/04; H04L 43/091
See application file for complete search history.

(56) References Cited

U.S. PATENT DOCUMENTS

| | | | | |
|---|---|---|---|---|
| 11,252,655 | B1 * | 2/2022 | Gupta | H04L 67/02 |
| 2023/0244533 | A1 * | 8/2023 | Bhandari | G06F 9/5072 718/104 |
| 2023/0261952 | A1 * | 8/2023 | Chamarthi | H04L 41/5051 709/221 |
| 2023/0362069 | A1 * | 11/2023 | Cui | H04L 41/5051 |
| 2025/0344233 | A1 * | 11/2025 | Cyril | H04W 24/02 |
| 2026/0005934 | A1 * | 1/2026 | Cyril | H04L 41/5009 |

* cited by examiner

*Primary Examiner* — Philip C Lee

(57) ABSTRACT

A method implemented in a network system to provide anomaly detection simultaneously across elements along end-to-end provisioning flows. The method includes receiving a provisioning log captured from provisioning flows over a predefined period, wherein the provisioning log comprises operations and responses associated with provisioning flow elements comprising transaction types, subscriber segments, network provisioning catalogs (NPCs), and network elements (NEs); determining, based on the provisioning log, metrics, each indicating a success rate for a respective one of the provisioning flow elements; determining a machine learning (ML) model to approximate a probability density of the metrics; determining an anomaly at one or more of the provisioning flow elements based on the ML model; and triggering an action address to the detected anomaly.

20 Claims, 10 Drawing Sheets

Figure 5:
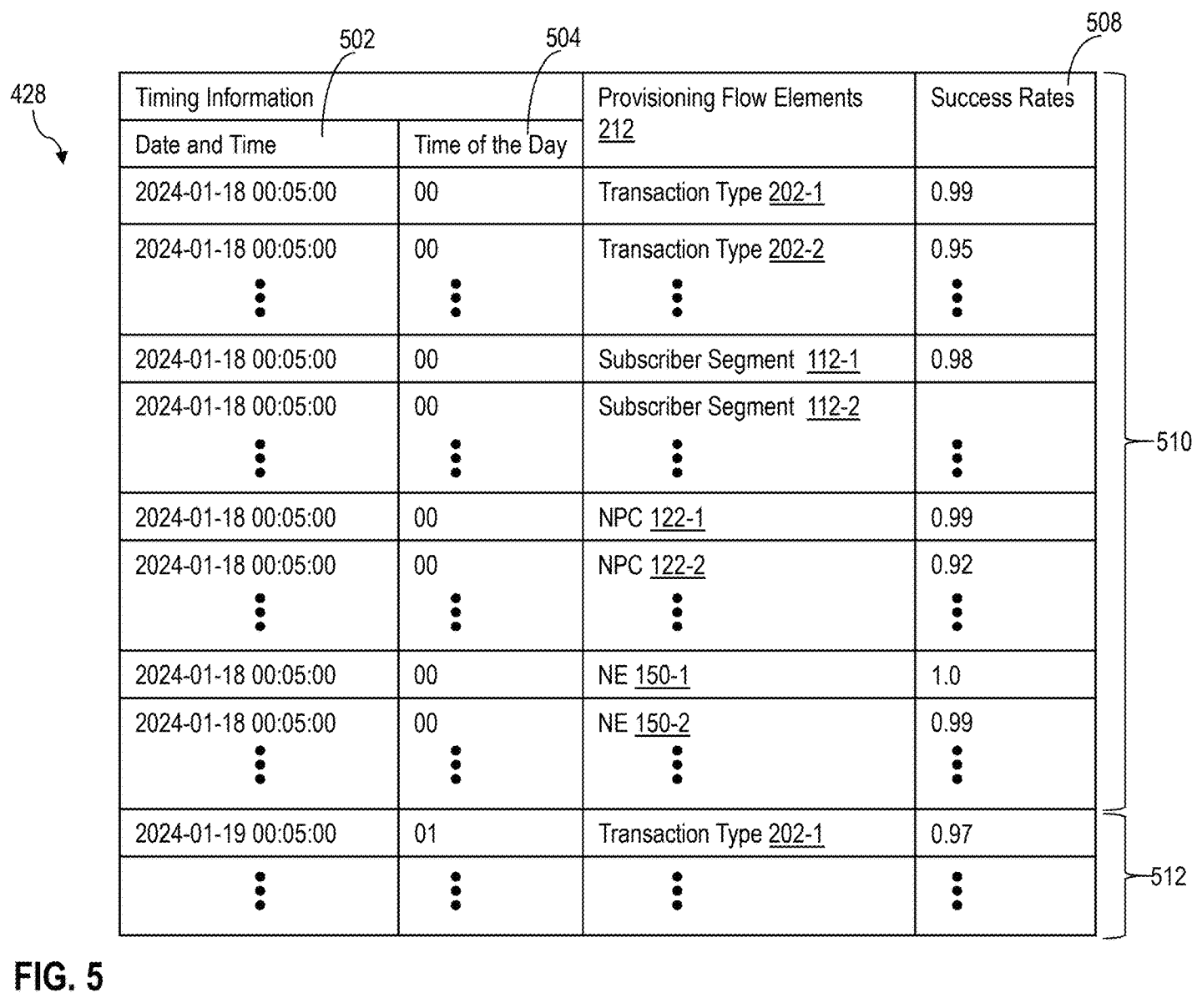

| Timing Information 502 | | Provisioning Flow Elements 212 | | Success Rates 508 |
|---|---|---|---|---|
| Date and Time | Time of the Day 504 | | | 510 |
| 2024-01-18 00:05:00 | 00 | Transaction Type 202-1 | | 0.99 |
| 2024-01-18 00:05:00 | 00 | Transaction Type 202-2 | | 0.95 |
| ••• | ••• | ••• | | ••• |
| 2024-01-18 00:05:00 | 00 | Subscriber Segment 112-1 | | 0.98 |
| 2024-01-18 00:05:00 | 00 | Subscriber Segment 112-2 | | |
| ••• | ••• | ••• | | ••• |
| 2024-01-18 00:05:00 | 00 | NPC 122-1 | | 0.99 |
| 2024-01-18 00:05:00 | 00 | NPC 122-2 | | 0.92 |
| ••• | ••• | ••• | | ••• |
| 2024-01-18 00:05:00 | 00 | NE 150-1 | | 1.0 |
| 2024-01-18 00:05:00 | 00 | NE 150-2 | | 0.99 |
| ••• | ••• | ••• | | ••• |
| 2024-01-19 00:05:00 | 01 | Transaction Type 202-1 | | 0.97 |
| ••• | ••• | ••• | | ••• |

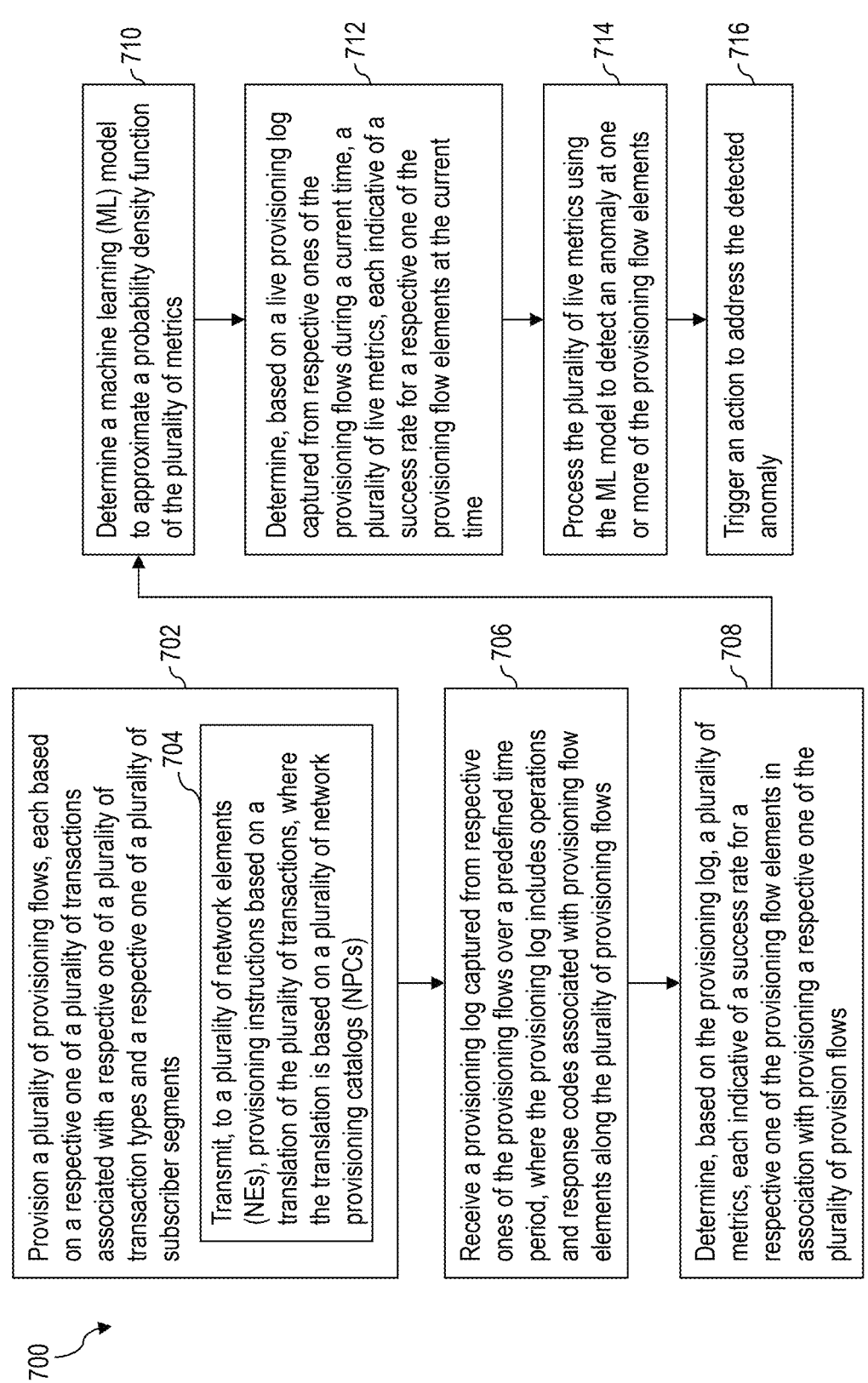

700

702 — Provision a plurality of provisioning flows, each based on a respective one of a plurality of transactions associated with a respective one of a plurality of transaction types and a respective one of a plurality of subscriber segments 704 — Transmit, to a plurality of network elements (NEs), provisioning instructions based on a translation of the plurality of transactions, where the translation is based on a plurality of network provisioning catalogs (NPCs)

706 — Receive a provisioning log captured from respective ones of the provisioning flows over a predefined time period, where the provisioning log includes operations and response codes associated with provisioning flow elements along the plurality of provisioning flows 708 — Determine, based on the provisioning log, a plurality of metrics, each indicative of a success rate for a respective one of the provisioning flow elements in association with provisioning a respective one of the plurality of provision flows 710 — Determine a machine learning (ML) model to approximate a probability density function of the plurality of metrics 712 — Determine, based on a live provisioning log captured from respective ones of the provisioning flows during a current time, a plurality of live metrics, each indicative of a success rate for a respective one of the provisioning flow elements at the current time 714 — Process the plurality of live metrics using the ML model to detect an anomaly at one or more of the provisioning flow elements 716 — Trigger an action to address the detected anomaly

FIG. 7

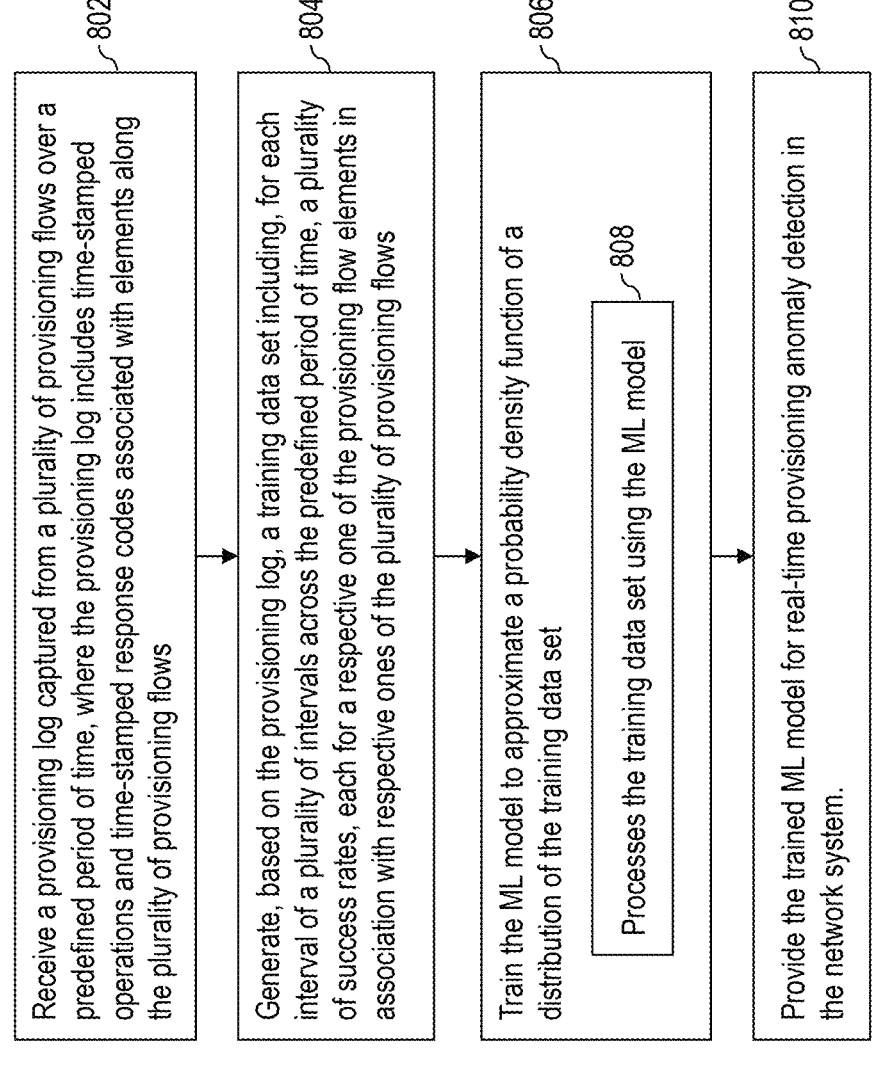

800

Receive a provisioning log captured from a plurality of provisioning flows over a predefined period of time, where the provisioning log includes time-stamped operations and time-stamped response codes associated with elements along the plurality of provisioning flows
802

Generate, based on the provisioning log, a training data set including, for each interval of a plurality of intervals across the predefined period of time, a plurality of success rates, each for a respective one of the provisioning flow elements in association with respective ones of the plurality of provisioning flows
804

Train the ML model to approximate a probability density function of a distribution of the training data set
806

Processes the training data set using the ML model
808

Provide the trained ML model for real-time provisioning anomaly detection in the network system.
810

FIG. 8

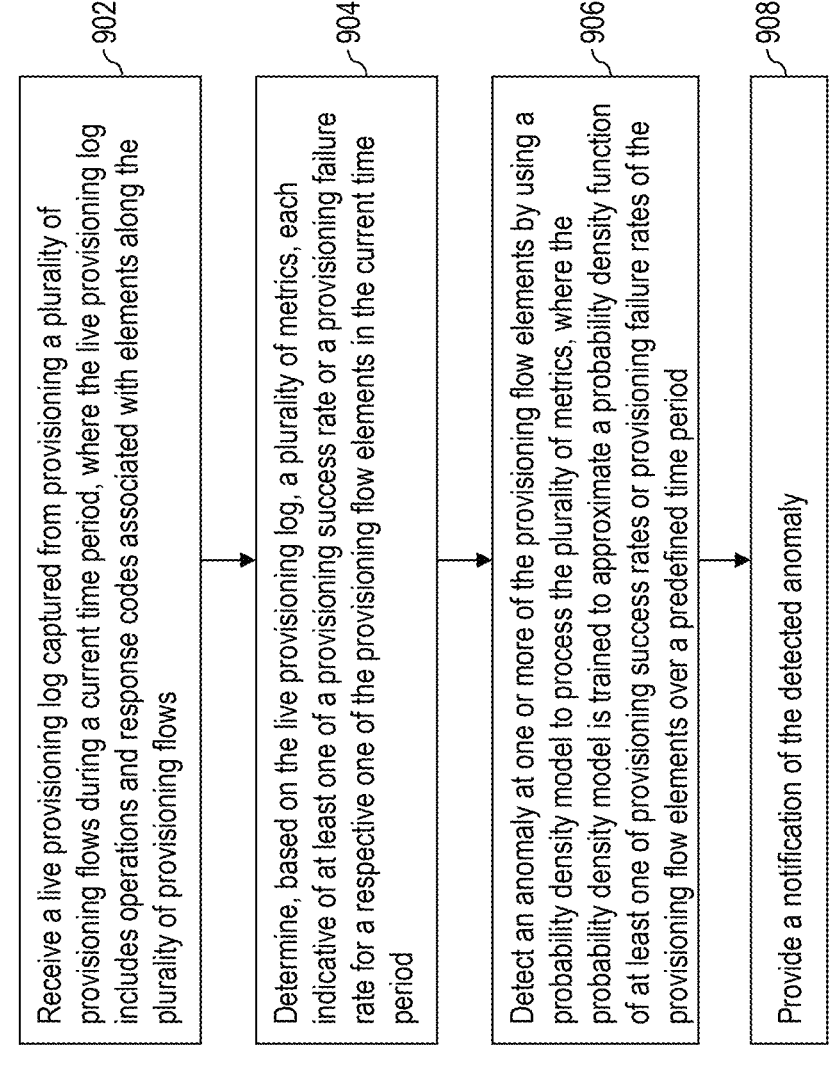

900

Receive a live provisioning log captured from provisioning a plurality of provisioning flows during a current time period, where the live provisioning log includes operations and response codes associated with elements along the plurality of provisioning flows

902

Determine, based on the live provisioning log, a plurality of metrics, each indicative of at least one of a provisioning success rate or a provisioning failure rate for a respective one of the provisioning flow elements in the current time period

904

Detect an anomaly at one or more of the provisioning flow elements by using a probability density model to process the plurality of metrics, where the probability density model is trained to approximate a probability density function of at least one of provisioning success rates or provisioning failure rates of the provisioning flow elements over a predefined time period

906

Provide a notification of the detected anomaly

EFFICIENT ANOMALY WORKFLOW DETECTION FOR END-TO-END PROVISIONING SYSTEMS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A telecommunications network may have numerous service brands that offer different rate plans to their subscribers. The features or services offered by the rate plans may differ substantially between the different service brands. For example, prepaid plans may require customers to prepay and have a balance before using a service like making a call, whereas postpaid plans may allow users to accumulate charges and bill the customer at the end of each month. Features such as fifth generation (5G) access, the number of gigabytes of online data, the number of calling minutes or unlimited calling, and call forwarding may vary between the different rate plans.

Telecommunications provisioning may refer to the process of preparing and equipping a telecommunications network to provide services to users based on their subscribed rate plans. This involves setting up and configuring the necessary hardware and software infrastructure, ensuring that all required resources are available and properly configured to deliver the intended telecommunications services, such as voice, text, and/or data.

SUMMARY

In an embodiment, a method implemented in a network system to provide efficient anomaly detection simultaneously across elements along end-to-end provisioning flows in the network system is disclosed. The method includes provisioning, by a network provisioning application implemented in a first computer system, a plurality of provisioning flows, each based on a respective one of a plurality of transactions associated with a respective one of a plurality of transaction types and a respective one of a plurality of subscriber segments, wherein the provisioning comprises transmitting, by the network provisioning application, to a plurality of network elements (NEs), provisioning instructions based on a translation of the plurality of transactions, wherein the translation is based on a plurality of network provisioning catalogs (NPCs); receiving, by an anomaly detection application implemented in a second computer system, a provisioning log captured from provisioning respective ones of the provisioning flows over a predefined time period, wherein the provisioning log comprises operations and response codes associated with provisional flow elements along the plurality of provisioning flows, wherein the provisioning flow elements comprises the plurality of transaction types, the plurality of subscriber segments, the plurality of NPCs, and the plurality of NEs; determining, by the anomaly detection application, based on the provisioning log, a plurality of metrics, each indicative of a success rate for a respective one of the provisioning flow elements in association with provisioning a respective one of the plurality of provision flows; determining, by the anomaly detection application, a machine learning (ML) model to approximate a probability density function of the plurality of metrics; determining, by the anomaly detection application, an anomaly at one or more of the provisioning flow elements based on the ML model; and triggering, by the anomaly detection application, an action to address the detected anomaly.

In another embodiment, a method implemented in a network system to train a machine learning (ML) model to provide anomaly detection simultaneously across elements along end-to-end provisioning flows is disclosed. The method includes receiving, by an application implemented in a computer system of the network system, a provisioning log captured from a plurality of provisioning flows over a predefined period of time, wherein the plurality of provisioning flows are based on service requests that are associated with a plurality of transaction types and a plurality of subscriber segments, wherein the provisioning log comprises time-stamped operations and time-stamped response codes associated with provisional flow elements along the plurality of provisioning flows, and wherein the provisioning flow elements comprise the plurality of transaction types, the plurality of subscriber segments, a plurality of network provisioning catalogs (NPCs) including a translation of service plan features of the plurality of subscriber segments into provisioning instructions for a plurality of network elements (NEs), and the plurality of NEs; generating, by the application, based on the provisioning log, a training data set comprising, for each interval of a plurality of intervals across the predefined period of time, a plurality of success rates, each for a respective one of the provisioning flow elements in association with respective ones of the plurality of provisioning flows; training, by the application, the ML model to approximate a probability density function of a distribution of the training data set, wherein the training comprises processing the training data set by the ML model; and providing, by the application, the trained ML model for real-time provisioning anomaly detection in the network system.

In yet another embodiment, a method implemented in a network system to provide efficient anomaly detection simultaneously across elements along end-to-end provisioning flows is disclosed. The method includes receiving, by an application implemented in a computer system of the network system, a live provisioning log captured from a plurality of provisioning flows during a current time period, wherein the plurality of provisioning flows are based on service requests that are associated with a plurality of transaction types and a plurality of subscriber segments, wherein the live provisioning log comprises response codes associated with provisional flow elements along the plurality of provisioning flows, and wherein the provisioning flow elements comprise the plurality of transaction types, the plurality of subscriber segments, a plurality of network provisioning catalogs (NPCs) including a translation of service plan features of the plurality of subscriber segments into provisioning instructions for a plurality of network elements (NEs), and the plurality of NEs; determining, by the application, based on the live provisioning log, a plurality of metrics, each indicative of at least one of a provisioning success rate or a provisioning failure rate for a respective one of the provisioning flow elements in the current time period; detecting, by the application, an anomaly at one or more of the provisioning flow elements by using a probability density model to process the plurality of metrics, wherein the probability density model is trained to approximate a probability density function of at least one of provisioning success rates or provisioning failure rates of the provisioning flow elements over a predefined time period; and providing, by the application, a notification of the detected anomaly.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, where like reference numerals represent like parts.

FIG. 5 illustrates an example training data set for training a probability density model for anomaly detection in end-to-end provisioning flows according to an embodiment of the disclosure.

FIG. 7 is a flow chart of a method according to an embodiment of the disclosure.

FIG. 8 is a flow chart of another method according to an embodiment of the disclosure.

FIG. 9 is a flow chart of yet another method according to an embodiment of the disclosure.

DETAILED DESCRIPTION

Figure 1:
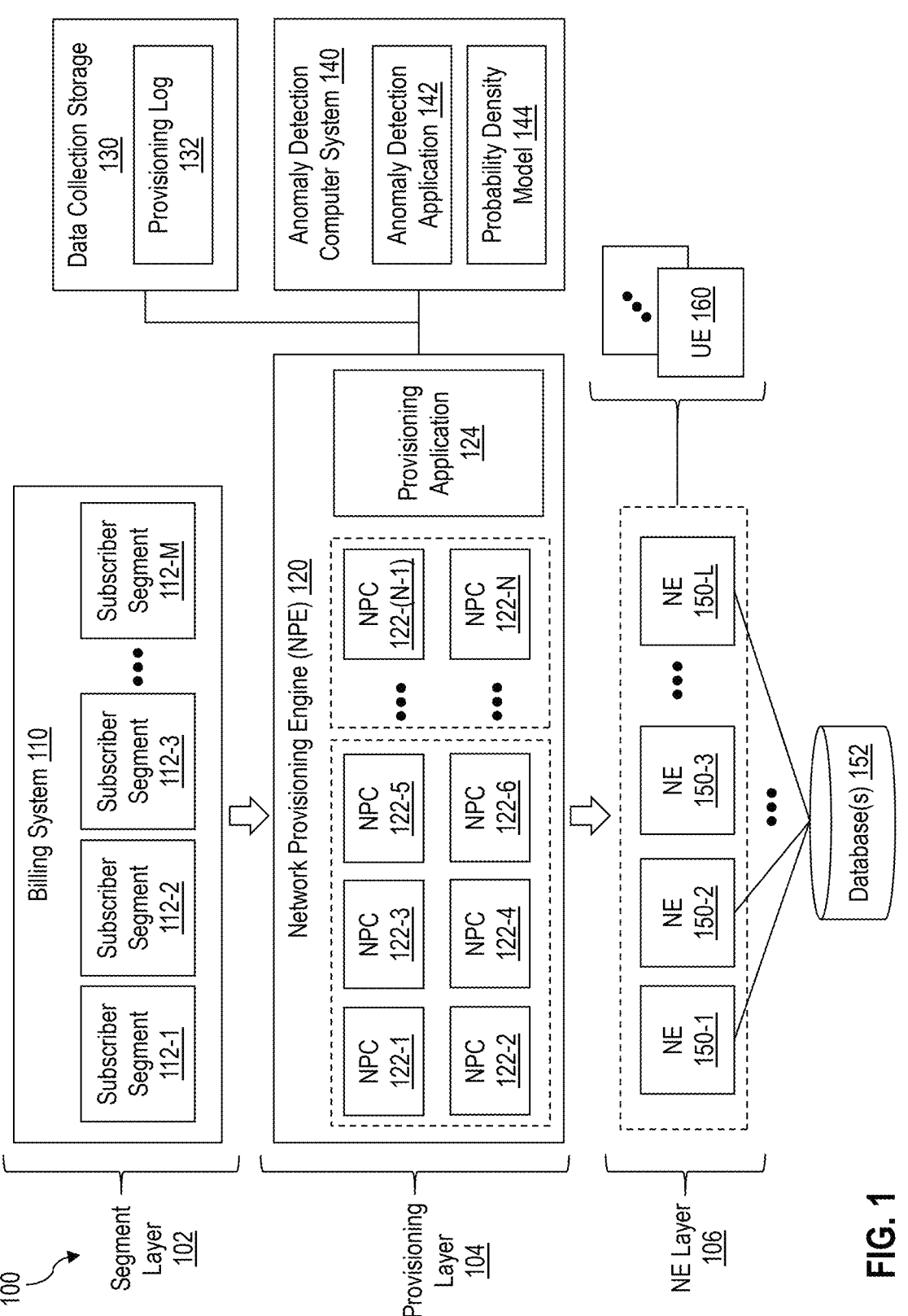
FIG. 1 is a block diagram of a network system that provides network provisioning with efficient anomaly detection according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A telecommunications network or mobile service provider network may have a network stack that includes several layers, e.g., a segment layer at the top, a provisioning layer in the middle, and a network element (NE) layer at the bottom. The segment layer may include a billing system. The provisioning layer may include a network provisioning engine (NPE). The NE layer may include multiple network elements (NEs) or network nodes. The billing system may manage billings for multiple subscriber segments (or service brands) that offer telecommunication services to subscribers. Examples of subscriber segments may include, for example, but are not limited to, prepaid service brands, post-paid service brands, and/or Internet of things (IoT) service brands. The billing system may store customer information (e.g., rate plans subscribed by the users). The billing system may send transactions (e.g., each including an indication of a respective rate plan) to the NPE to request services to be provisioned to the subscribers. The transactions may be of various transaction types, for example, including, but not limited to, a service activation, a service deactivation, a service suspension, a service restoration, a billing cycle change, a service feature change, a femto cell activation, a line reprocessing (refresh/reconcile), port in, port out, update customer profile, update international mobile equipment identity (IMEI), a voicemail password change, a balance adjustment, query network features, query subscriber usage, update subscriber, an identity access management, a subscriber identity module (SIM) change, a phone number change, and an invalid transaction type. The NPE may operate as a unified provisioning system that automates provisioning of network services in the network. For instance, the NPE may translate services and features of the rate plans into network services that the NEs may provision to the subscribers.

The NPE may include network provisioning catalogs (NPCs) to assist the translation. The NPCs are technical catalogs that include service and resource information modeled as customer facing service specifications (CFSs), resource facing service specifications (RFSSs), and logical resource specifications (LRSs). For instance, a CFS may include features (e.g., voicemail services (VMSs), short messaging services (SMSs), data or Internet services, etc.) of rate plans. The CFS may further identify one or more RFSSs that define NEs that are responsible for provisioning those rate plan features. An RFSS may identify one or more LRSs that define configuration parameters and corresponding values that are to be configured at the NEs to provision those rate plan features. Stated differently, the NPCs may capture the CFS-RFSS-LRS relationships or mappings for respective segments or service brands. Based on the translation or the CFS-RFSS-LRS mappings, the NPE may send instructions to the appropriate NEs to provision the services.

Issues and/or failures can occur in provisioning processes. Those issues and/or failures can impact day-to-day network operations, network performance, and user experience for the subscribers or customers. If the impact to the subscribers prolongs, the subscribers may contact customer care. This can generate a large amount of customer care or support calls or traffic (e.g., thereby increasing network congestion and reducing network capacity) and may overwhelm the customer care system. Accordingly, it may be desirable to locate and correct detected issues and/or failures as soon as possible. While the billing system, the NPE, and the NEs may each monitor the provisioning processes, the monitoring is performed locally at the respective billing system, the NPE, and the NEs. That is, the billing system, the NPE, and the NEs perform monitoring separately and independently of each other. Thus, there is a lack of a global view of all the issues and/or failures across the network layers and across the NEs. With thousands of rate plans and millions of subscribers, there is not an easy way to know whether issues and/or failures in the provisioning processes are related or not. For instance, in some cases, issues and/or failures may be detected at a certain subscriber segment and at a certain NE at different times (e.g., separated by hours or days) while those issues and/or failures are related. Thus, it may be challenging for network operators to locate (or pinpoint) and fix (or correct) the error source (e.g., a specific type of service request, a specific subscriber segment, a specific NPC, and/or a specific NE) that caused the issues and/or failures. Furthermore, as the number of subscribers continues to increase, new service rate plans or brands continue to be added to the network, and provisioning parameters continues to change, locating and fixing error sources in network provisioning may become even more challenging.

The present disclosure provides a technical solution to the aforementioned technical problems in the technical field of network provisioning to provide efficient techniques for detecting anomalies simultaneously across network layers (e.g., a top segment layer, a middle provisioning layer, and a bottom NE layer) of a network. Further, because the anomalies across the network layers are detected simultaneously, the detected anomalies may be correlated to quickly locate (e.g., within minutes) an error source in the network (e.g., one or more elements in the segment layer, the provisioning layer, and the NE layer) at the time when an anomaly event is triggered.

According to an embodiment of the present disclosure, a network system may include a billing system, an NPE, a storage device, an anomaly detection computer system (which may also be referred to as an anomaly detection system), and multiple NEs. The billing system may be part of a segment layer of the network system. The NPE, the storage device, and the anomaly detection computer system may be part of a provisioning layer of the network system. The NEs may be part of an NE layer of the network system. The billing system (e.g., a computer system, server(s)) may perform billing operations associated with multiple subscriber segments. The NPE (e.g., a computer system, server(s)) may include processor(s), non-transitory memory, NPCs (e.g., CFSs, RFSSs, and LRSs) stored at the non-transitory memory, and a network provisioning application including instructions stored at the non-transitory memory and executable by the processor(s). The network provisioning application may receive transactions (e.g., service requests) from the billing system. Each of the transactions may be associated with a respective one of the subscriber segments and a respective one of transaction types. The network provisioning application may translate each transaction into a provisioning instruction based on respective ones of the NPCs (e.g., a CFS-RFSS-LRS mapping). The network provisioning application may transmit the provisioning instructions to the NEs for provisioning services to subscribers of the subscriber segments. Stated differently, the network provisioning application may provision provisioning flows, each based on a transaction associated with a respective one of the transaction types and a respective one of the subscriber segments.

As used herein, the term "provisioning flow" may refer to the provisioning of a service, for example, starting from the billing system initiating a transaction (or a service request) of a particular transaction type for a particular subscriber segment, to the NPE translating the transactions into provisioning instructions based on the NPC(s), and finally the NE(s) provisioning the services based on the provisioning instructions. The elements along a provisioning flow may be referred to as provisioning flow elements, which may include the transaction types, the subscriber segments, the NPCs, and the NEs.

To facilitate end-to-end provisioning anomaly detection (e.g., from the segment layer to the NE layer), the network provisioning application may capture or generate a provisioning log as part of the provisioning process. The provisioning log may include operations and corresponding response codes (e.g., indicating successes, failures, and/or reasons of failures, etc.) associated with the provisioning flow elements. The operations and corresponding codes may be captured from respective ones of the provisioning flows over a predefined period of time. The predefined period of time may be substantially long (e.g., about a month, about 30 days, about 20 days to 35 days). The provisioning log may further include timing information associated with the operations and the response codes. For instance, each of the operations and response codes may have an associated timestamp indicating a time at which the respective operation or the respective response code is captured. That is, the operations and response codes are time-stamped operations and time-stamped response codes. In an example, a capture in the provisioning log may indicate the transaction, the transaction type of the transaction, the subscriber segment from which the service (the transaction) is requested, the NPC(s) that are used for translating the transaction into provisioning instructions, and the NE(s) that provision the service based on the provisioning instructions, and time-stamped operations and time-stamped response codes (e.g., fail or success) at respective provisioning flow elements. The provisioning log may be stored in the storage device and may be used by the anomaly detection computer system to generate or train a probability density model for detecting anomalies in subsequent provisioning.

The anomaly detection computer system may include processor(s), non-transitory memory, and an anomaly detection application including instructions stored at the non-transitory memory and executable by the processor(s). The anomaly detection application may generate, based on the provisioning log, a training data set for training the probability density model to perform provisioning anomaly detection. As part of generating the training data set, the anomaly detection application may partition the predefined period into successive intervals (e.g., each with a duration of about an hour). The anomaly detection application may determine, based on the provisioning log, for each of the provisioning flow elements and in each of the intervals, a number of successes (e.g., a success count) and a number of failures (a failure count) at the respective provisioning flow element based on respective operations and/or respective response codes. The anomaly detection application may further determine a metric (e.g., a success rate) for each provisioning flow element in each interval based on a respective success count and a respective failure count. As an example, when the success rates are calculated for every hour in the predefined period of time, the metrics are hourly metrics per provisioning flow element. The anomaly detection application may include, in the training data set, success rates and corresponding timing information (e.g., at intervals across the predefined period) for each provisioning flow element. The timing information may include, for example, an indication of a date and time (e.g., in a year-month-day-hour-minute-second format, such as 2024 Jan. 18 00:05:00) and/or a time of the day (e.g., 01 hour to 23 hours) for each success rate.

After generating the training data set, the anomaly detection application may train the probability density model to approximate a probability density function that represents a distribution of the training data set. As part of the training, the anomaly detection application may provide the training data set as input to the probability density model. The probability density model may process the training data set. The anomaly detection application may evaluate the accuracy of the probability density model in approximating the probability density function. By including the time of the day and/or the date and time for each success rate in the training data set, the probability density model may be trained to learn what is the expected success rate for a provisioning flow element at a certain time of the day and/or on a certain day and time. The anomaly detection application may tune or adjust parameters of the probability density model based on the evaluation. In an example, the anomaly detection application may adjust a probability density threshold of the probability density model. The probability density threshold is a cut-off value used to determine whether an input data point (e.g., a success rate) is an outlier of the approximated probability density function or not. In an embodiment, the probability density model is trained using machine learning (ML) techniques. In an embodiment, the probability density function approximated by the probability density model is a kernel density estimation (KDE) function.

After the probability density model is trained, the probability density model may be deployed as a ground truth model for detecting anomalies at the provisioning flow elements. For instance, during the deployment, the anomaly detection application may determine an anomaly at one or more of the provisioning flow elements based on the ML model. As part of determining the anomaly, the anomaly detection application may determine, based on a live (or real-time) provisioning log, live metrics (e.g., successive rates) for the provisioning flow elements. The live provisioning log may be captured from live provisioning flows during a current time period (e.g., a short time period such as 5-10 minutes). The anomaly detection application may determine the live metrics in a substantially similar way as for generating the training data set. For instance, the anomaly detection application may determine a success rate for each of the provisioning flow elements during the current time period and feed the success rates and corresponding timing information to the trained probability density model. The trained probability density model may process the success rates and corresponding timing information and output an indication of whether an anomaly is detected at any of the provisioning flow elements. Stated differently, during the deployment, the trained probability density model is used to provide real-time anomaly detection on provisioning flows that are currently being provisioned.

If the anomaly detection application determines an anomaly at one or more of the provisioning flow elements, the anomaly detection application may trigger an action to address the detected anomaly. In an embodiment, the action to address the detected anomaly may include generating a dashboard including an indication of the detected anomaly and errors associated with the one or more of the provisioning flow elements at which the anomaly is detected. In an embodiment, the action to address the detected anomaly may include transmitting, to a responsible party for the detected anomaly, a notification of the detected anomaly (e.g., in the form of an email, a text, or a voice call). In an embodiment, the action to address the detected anomaly may include displaying, on a displaying device, an indication of the detected anomaly.

In an embodiment, the detected anomaly may include a first anomaly detected at a first provisioning flow element of the provisioning flow elements and a second anomaly detected at a second provisioning flow element of the provisioning flow elements different than the first provisioning flow element, and the action to address the detected anomaly may include determining an error in the network system based on a correlation between the first anomaly at the first provisioning flow element and the second anomaly at the second provisioning flow element. As an example, multiple anomalies may be detected at various NPCs and/or NEs and at a specific subscriber segment (e.g., a certain post-paid service brand). As such, the source of the error may be narrowed down to issues with billings associated with the post-paid service brand. As another example, multiple anomalies may be detected at various NPCs and/or NEs and for a specific transaction type, e.g., service activation. As such, the source of the error may be narrowed to issues with service activation. In an embodiment, the output of the probability density model may indicate multiple anomalies at multiple provisioning flow elements, and the anomaly detection application may further apply various filters to the detected anomalies to determine anomalies that are impacting customers, anomalies that are not impacting customers, anomalies that are of a high priority, anomalies that are of a low priority, and/or anomalies that are persistent and requires actions to be performed.

In an embodiment, after the probability density model is deployed for real-time provisioning anomaly detection in the system, the anomaly detection application may continue to update the probability density model using new or recent provisioning logs. For instance, the anomaly detection application may retrain the probability density model based on a subsequent provisioning log captured from provisioning the services in a subsequent time period. As an example, the NPE may continue to log operations and responses associated with the provisioning flow elements as services are being provisioned, and the anomaly detection application may retrain the probability density model periodically using the most recent provisioning log. For instance, the anomaly detection application may retrain the probability density model weekly using a provisioning log captured in the last 30 days.

Training a probability density model based on per provisioning flow element and per unit time success rates enables the probability density model to model the probability density of a distribution of the success rates of all the provisioning flow elements across time. As such, the trained probability density model can be applied to detect anomalies simultaneously across the provisioning flow elements in end-to-end provisioning flows. Because the anomalies across the provisioning flow elements in the end-to-end provisioning flows are detected simultaneously, the detected anomalies may be correlated to quickly locate an error source in the network (e.g., one or more of the provisioning flow elements from the different network layers) at the time when an anomaly event is triggered. As such, issues and/or failures in provisioning can be corrected in a timely manner, thereby increasing system and network capacity while ensuring a significantly better customer experience. While the present disclosure is discussed in the context of utilizing success rates at the provisioning flow elements as metrics for training the probability density model, the probability density model can also be trained using failure rates at the provisioning flow elements to provide similar efficient end-to-end provisioning anomaly detection as discussed herein.

Turning now to FIG. 1, a network system 100 is described. The network system 100 may be a telecommunications service provider network or a mobile service provider network used for provisioning communications services (e.g., voice services, SMS services, RCS services, Internet services, etc.) to subscribers. In an example, the network system 100 may be part of a wireless communication network (e.g., a fifth generation (5G) or sixth generation (6G) network). In one embodiment, the network system 100 may be part of a core network associated with the service provider. As shown in FIG. 1, the network system 100 includes a segment layer 102 (which may also be referred to as an enterprise information technology layer (EIT) layer), a provisioning layer 104, and an NE layer 106. The segment layer 102 includes a billing system 110. The provisioning layer 104 includes an NPE 120. The NE layer 106 includes a plurality of NEs 150 (individually shown as 150-1 to 150-L, where L may be any suitable integer value). In some instances, the segment layer 102 may be referred to as north bound, and the NE layer 106 may be referred to as south bound.

The billing system 110 (e.g., a computer system, server(s)) may manage billings for a plurality of subscriber segments 112 (individually shown as 112-1 to 112-M, where M may be any suitable integer value). The billing system 110 may include user profiles corresponding to users of UEs 160 that subscribe to services provided by the subscriber segments 112. The subscriber segments 112 may correspond to different service brands, such as prepaid service brands, post-paid service brands, and/or IoT service brands. Those service brands (e.g., private businesses, wholesalers, etc.) may offer services to users of the UEs 160 using resources and infrastructures of the network system 100. In an example, the service brands may include T-mobile postpaid, T-mobile prepaid, wholesale, Magenta, Magenta postpaid, Sprint, etc. Further, each service brand may offer various service rate plans (e.g., a certain number of gigabytes of online data, unlimited calling, etc.)

The billing system 110 may initiate transactions to request for services to be provisioned to the users of the UEs 160. The transactions may be of various transaction types, for example, including, but not limited to, a service activation, a service deactivation, a service suspension, a service restoration, a billing cycle change, a service feature change, an identity access management, a subscriber identity module (SIM) change, and a phone number change. For instance, the billing system 110 may transmit transactions (e.g., including rate plan information) to the provisioning layer 104.

The UEs 160 may be a cell phone, a mobile phone, a smart phone, a personal digital assistant (PDA), an Internet of things (IoT) device, a wearable computer, a headset computer, a laptop computer, a tablet computer, a notebook computer, embedded wireless modules, and/or other wirelessly equipped communication devices.

The NPE 120 (e.g., a computer system or servers(s)) is a provisioning system. The NPE 120 may include at least one processor and at least one non-transitory memory. The NPE 120 may include a plurality of NPCs (individually shown as 122-1 to 122-N, where N may be any suitable integer value) stored at the at least one non-transitory memory. The NPCs are technical catalogs that provide CFS-RSS-LRS mappings as discussed above. The NPE 120 may further include a network provisioning application 124 stored at the at least one non-transitory memory and executable by the at least one processor. The network provisioning application 124 may receive the transactions (e.g., service request) from the billing system 100. The network provisioning application 124 may translate the transactions into provisioning instructions based on the plurality of NPCs 122 (e.g., that provide mappings of service features of rate plans to network resources such as the NEs and corresponding configurations for the NEs). The network provisioning application 124 may transmit the provisioning instructions to the appropriate NEs 150 for provisioning services to subscribers of the subscriber segments 112.

Figure 2:
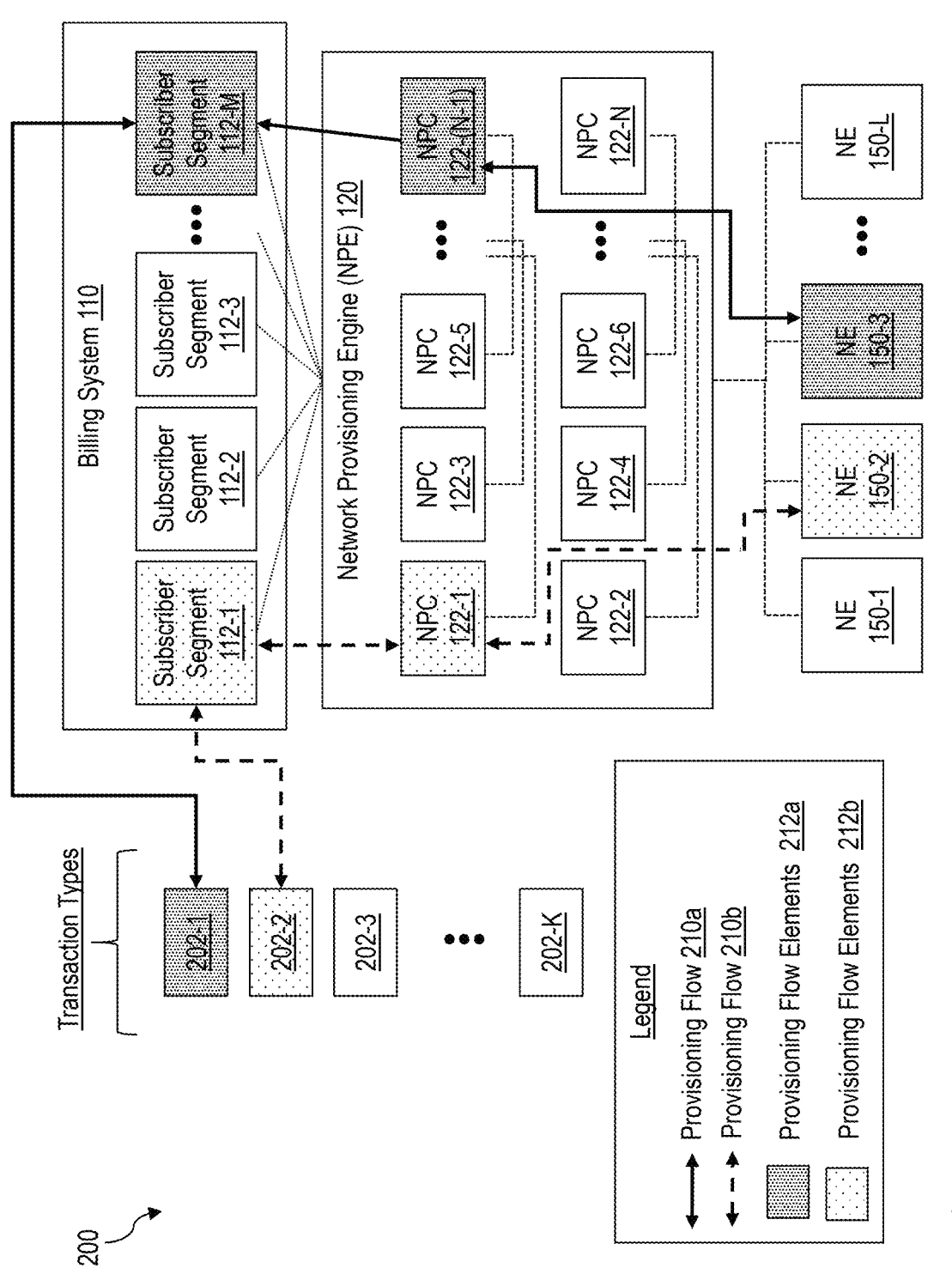
FIG. 2 is a block diagram illustrating an example provisioning scenario according to an embodiment of the disclosure.

The NEs 150 are network nodes including hardware and software components configured to provision services to the UEs 160 based on provisioning instructions received from the NPE 120. Examples of NEs 150 may include, for example, but are not limited to, over-the-air (OTA) nodes, provisioning gateway (PGW), home location register (HLR), home subscriber server (HSS), application publisher, SMS server, VMS server, web services gateway (WSG), charging system, femtocell provisioning nodes, identify access management (IAM) system, etc. The NEs 150 may further communicate with one or more databases 152 to provision the requested services. In an example, one or more of the databases 152 may store the user profiles of subscribers (e.g., users of the UEs 160) for all subscriber segments 112. In some examples, multiple NEs 150 may share or access the same database 152. In some examples, different NEs 150 may access different databases 152. An example provisional flow is shown in FIG. 2.

As an example, the billing system 110 may send a transaction for activating an SMS service for a subscriber subscribed to a certain rate plan provided by a certain subscriber segment 112 (e.g., the subscriber segment 112-1). Upon the network provisioning application 124 receiving the transaction from the billing system 110, the network provisioning application 124 may identify NPCs (e.g., CSF(s), RFSS(s), and LRS(s)) associated with the activation of the SMS service under the rate plan for the subscriber segment 112. The network provisioning application 124 may translate the transaction into provisioning instructions based on the CSF-RFSS-LRS mappings identified from the NPCs. The network provisioning application 124 may configure NEs 150 that are responsible for provisioning the requested SMS service. In an example, the NE(s) 150 may obtain an SMS user profile from a database 152 to populate profile information associated with the subscriber and the SMS service plan.

Figure 3:
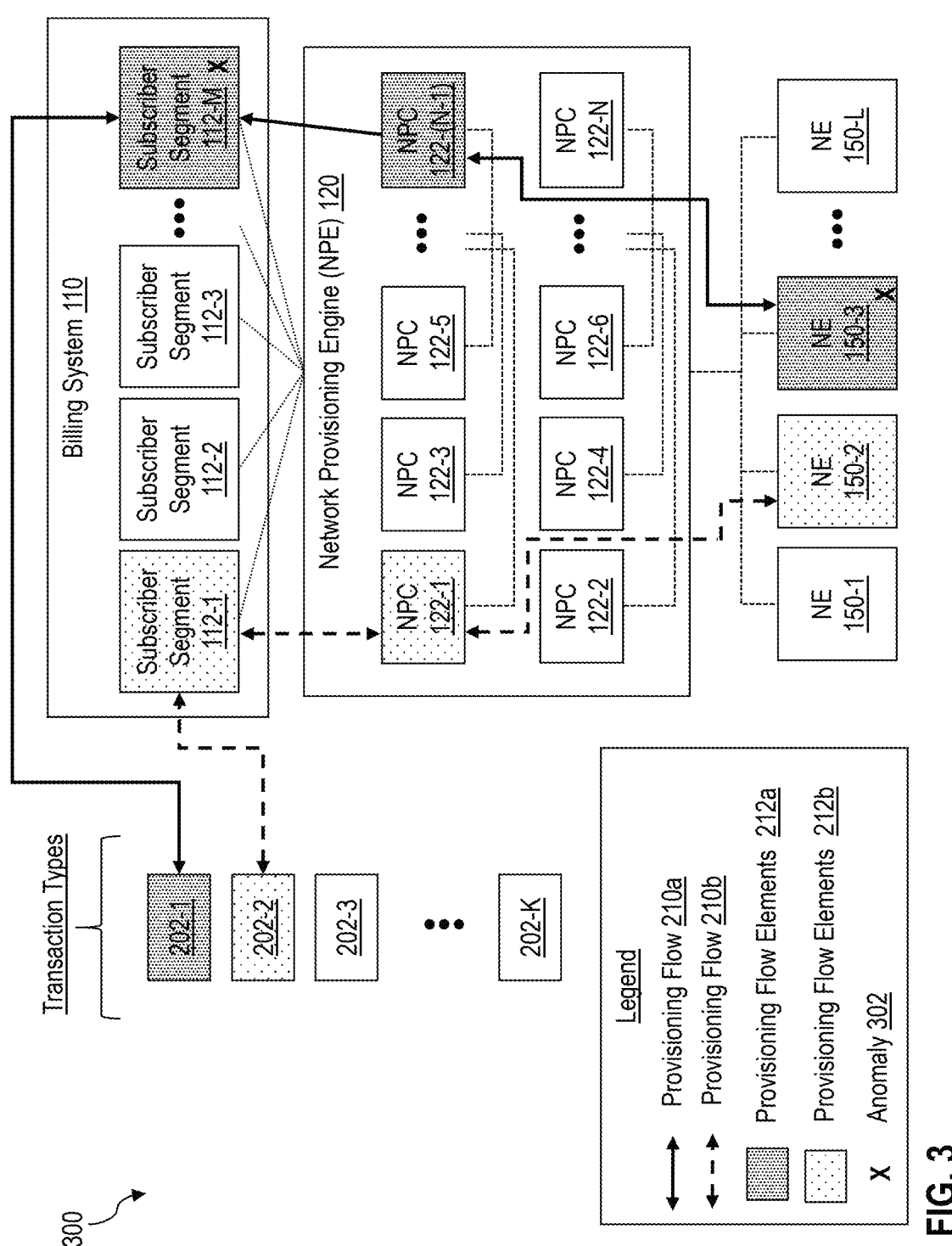
FIG. 3 is a block diagram illustrating another example provisioning scenario according to an embodiment of the disclosure.

As discussed above, issues and/or failures may occur in provisioning certain services (e.g., shown in FIG. 3). Those issues and/or failures can impact day-to-day network operations, network performance, and user experience for the subscribers or customers. To facilitate end-to-end provisioning anomaly detection (e.g., from the segment layer 102 to the NE layer 106), the network provisioning application 124 may additionally capture or generate a provisioning log 132 as part of the provisioning process. The provisioning log 132 may be stored at a data collection storage device 130.

The anomaly detection computer system 140 may include processor(s), non-transitory memory, and an anomaly detection application 142 including instructions stored at the non-transitory memory and executable by the processor(s). The anomaly detection application 142 may train a probability density model 144 (e.g., an ML model) based on the provisioning log 132. After the probability density model 144 is trained, the probability density model 144 may be deployed to perform real-time provisioning anomaly detection. After the probability density model 144 is deployed, the anomaly detection application 144 may continue to update or retrain the probability density model 144. The training, deployment, and updating of the probability density model 144 will be discussed more fully below with reference to FIGS. 4-5.

FIG. 1 is merely an example of components of a network system, and variations are contemplated to be within the scope of the present disclosure. In embodiments, the network system may include other components not illustrated in FIG. 1. In embodiments, the network system may not include every component illustrated in FIG. 1. In embodiments, the components and connections may be implemented with different connections than those illustrated in FIG. 1. For instance, while FIG. 1 illustrates the anomaly detection application 142 implemented in the anomaly detection computer system 140 separate from the NPE 120, the anomaly detection application 142 may be implemented as part of the NPE 120. Such and other embodiments are contemplated to be within the scope of the present disclosure.

Turning now to FIG. 2, an example provisioning scenario 200 in the network system 100 is described. The scenario 200 includes a provisioning flow 210a and a provisioning flow 210b. For ease of illustration, FIG. 2 only shows components that are related to the provisioning flows 210a and 210b. In FIG. 2, the dotted lines represent communications between components of the network system 100 to facilitate provisioning services to the UEs 160. In the scenario 200, the billing system 110 may initiate transactions of various transaction types 202 (individually shown as 202-1 to 202-K, where K may be any suitable integer value). For example, the transaction types 202 may include service activation, service deactivation, service suspension, service restoration, billing cycle change, service feature change, identity access management, SIM change, and phone number change.

In the provisioning flow 210a, the billing system 110 may initiate a transaction of the transaction type 202-1. The transaction may be associated with the subscriber segment 112-M. The NPE 120 (or more specifically the network provisioning application 124) may receive the transaction and translate, based on the NPC 122-(N−1), the transaction into provisioning instructions for the NE 150-3 to provision the service requested by the transaction. The particular provisioning flow elements 212a in the provisioning flow 210a may include the transaction type 202-1, the subscriber segment 112-M, the NPC 122-(N−1) and the NE 150-3.

In the provisioning flow 210b, the billing system 110 may initiate a transaction of the transaction type 202-2. The transaction may be associated with the subscriber segment 112-1. The NPE 120 (or more specifically the network provisioning application 124) may receive the transaction and translate, based on the NPC 122-1, the transaction into provisioning instructions for the NE 150-2 to provision the service requested by the transaction. The particular provisioning flow elements 212b in the provisioning flow 210b may include the transaction type 202-2, the subscriber segment 112-1, the NPC 122-1, and the NE 150-2. While FIG. 2 illustrates a single NPC 122 being used in each of the provisioning flows 210a and 210b, multiple NPCs 122 may generally be used for translating transactions into provisioning instructions in a provisioning flow 210.

Turning now to FIG. 3, another example provisioning scenario 300 is described. Anomalies can occur at any provisioning flow element 212 along a provisioning flow 210. In the illustrated example of FIG. 3, anomalies 302 (shown by the "X" symbols) are detected at the subscriber segment 112-M and the NE 150-3 of the provisioning flow 210a. As an example, in the provisioning flow 210a, the transaction type 202-1 is an activation and the transaction is to activate an SMS service provided by the subscriber segment 112-M for a user (of a UE 160). The NPE 120 may configure and instruct the NE 150-3 to provision the SMS service to the user. The NE 150-3 may determine that the SMS service provision fails because there is no SMS profile for the user under the subscriber segment 112-M. Thus, an anomaly 302 is detected at the NE 150-3. In other examples, an anomaly 302 may occur due to internal error(s) for a particular transaction type 202, a particular subscriber segment 112, or a particular NPC 122.

Figure 4:
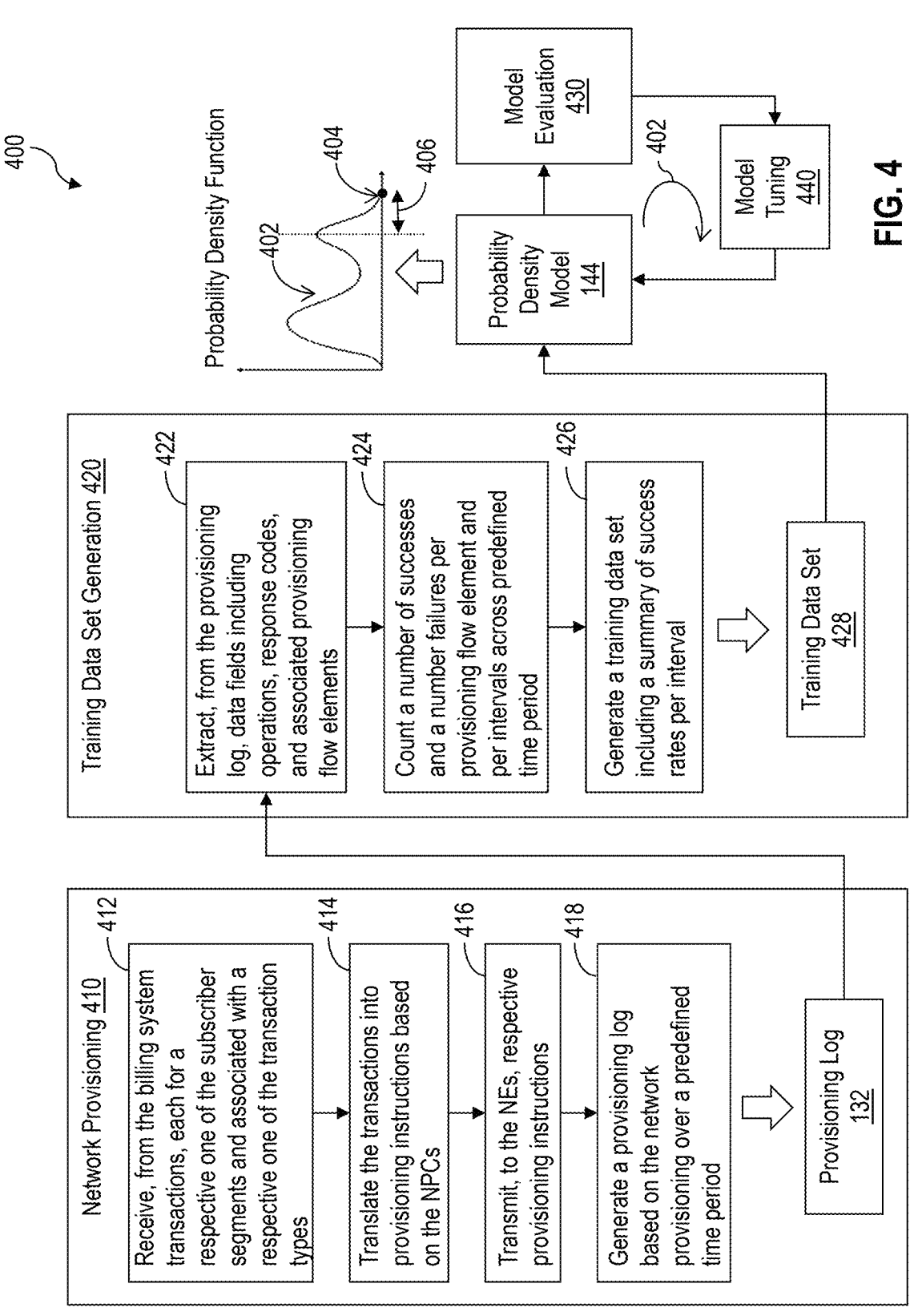
FIG. 4 is a block illustrating an example method of training a probability density model to provide efficient anomaly detection in end-to-end provisioning flows according to an embodiment of the disclosure.

Turning now to FIG. 4, an example method 400 of training the probability density model 144 to provide efficient anomaly detection in end-to-end provisioning flows 210 is described. The method 400 may be implemented by the network system 100. At block 410, the network provisioning application 124 may perform network provisioning (e.g., provisioning the provisioning flows 210). As part of the network provisioning, the network provisioning application 124 may perform operations at blocks 412-418. For instance, at block 412, the network provisioning application 124 may receive, from the billing system 110, transactions, each for a respective one of the subscriber segments 112 and associated with a respective one of the transaction types 202.

At block 414, the network provisioning application 124 may translate each of the transactions into a provisioning instruction based on respective ones of the NPCs 122. As part of the translation, for each transaction, the network provisioning application 124 may identify one or more CSFs associated with the transaction type 202 and the subscriber segment 112 of the transaction. The one or more CSFs may identify one or more RFSSs that define one or more NEs to provision the service requested by the transaction. The one or more RFSSs may identify one or more LRSs that define configurations (e.g., configuration parameters and corresponding values) for configuring the one or more NEs for provisioning the service requested by the transaction.

At block 416, the network provisioning application 124 may transmit, to the NEs 150, respective provisioning instructions (e.g., including configuration parameters and corresponding values). Referring to the examples discussed above with reference to FIGS. 2 and 3, the network provisioning application 124 may transmit a first provisioning instruction to the NE 150-3 for provisioning the provisioning flow 210a and may transmit a second provisioning instruction to the NE 150-2 for provisioning the provisioning flow 210b.

At block 418, the network provisioning application 124 may generate a provisioning log 132 based on provisioning the provisioning flows 210 over a predefined time period. To that end, the network provisioning application 124 may monitor each of the provisioning flow 210 and determine whether there is a failure in provisioning the service to a respective customer or subscriber. The network provisioning application 124 may log a variety of data. For example, for each transaction, the network provisioning application 124 may log the customer phone number (that initiated the transaction), the operations performed (e.g., providing a VMS service, an SMS service, Internet service, etc.), the corresponding response codes (e.g., success or failed), the reasons for the failures (if failed), and/or the duration of the failures (if failed). The network provisioning application 124 may determine success and/or failures for each of the provisioning flow elements 212 (e.g., the transaction types 202, the subscriber segments 112, the NPCs 122, and the NEs 150) in each of the provisioning flows 210. Further, the network provisioning application 124 may timestamp each piece of the logged data. As will be discussed more fully below, the timing information along with the logged data may be used for training the probability density model 144. In an example, the predefined time period may be between 28 days to 31 days (e.g., a month). In general, the predefined time period for capturing the provisioning log 132 for training the probability density model 144 may be sufficiently long so that the statistics (e.g., the number of successes and failures) of the captured data are representative of the distribution of the captured data. The network provisioning application 124 may store the provisioning log 132 in a data collection storage device 130.

Next, at block 420, the anomaly detection application 142 may perform training data set generation. As part of the training data set generation, the anomaly detection application 142 may perform operations at blocks 422-426. For instance, at block 422, the anomaly detection application 142 may extract, from the provisioning log 132, data fields including operations, response codes, and associated provisioning flow elements 212. At block 424, the anomaly detection application 142 may count a number of successes and a number of failures (related to provisioning respective ones of the provisioning flows 210) per provisioning flow element 212 and per intervals across the predefined time period. For instance, the anomaly detection application 412 may partition the predefined time period into successive intervals (e.g., about an hour long). At block 426, the anomaly detection application 142 may generate a training data set 428 including a summary of success rates (related provisioning respective ones of the provisioning flows 210) for each provisioning flow element 212 in each interval over the predefined time period.

Turning now to FIG. 5, an example training data set 428 for training the probability density model 144 for anomaly detection in end-to-end provisioning flows 210 is described. The training data set 428 may include success rates per provisioning flow element 212 and per time interval over the predefined time period during which the provisioning log 132 is captured. In the illustrated example of FIG. 5, the training data set 428 is arranged in a table format and the timer interval is an hour long. Generally, the predefined time period can be partitioned into intervals of any suitable duration (e.g., 5 minutes, 10 minutes, 20 minutes, 30 minutes an hour, 2 hours or more) and the training data set 428 may be arranged in any suitable way. As shown in FIG. 5, the training data set 428 includes, in each row, a success rate 508 for a respective one of the provisioning flow elements 212 at a respective date and time 504 (e.g., in a year-month-day-hour-minute-second format) and a respective time of the day 502. The training data set 428 may include a portion 510 including success rates 508 for each of the provisioning flow elements 212 in a first time interval (e.g., the first hour of the first day) of the predefined time period, a portion 512 including success rates for each of the provisioning flow elements 212 in a second, subsequent time interval (e.g., a second hour of the first day) of the predefined time period, and so on. Stated differently, the training data set 428 may include, for each interval of a plurality of intervals in the predefined time period, a sequence of success rates 508, each for a respective one of the provisioning flow elements 212. In other examples, the training data set 428 may include, for each of the plurality of provisioning flow elements 212, an individual sequence of success rates 508 associated with respective ones of the provisioning flows 210 in time across the predefined time period. In general, the training data set 428 may be arranged and presented to the probability density model 144 in any suitable format.

Returning to FIG. 4, after generating the training data set 428, the anomaly detection application 142 may train the probability density model 144 using the training data set 428. For instance, the anomaly detection application 142 may provide the training data set 428 to the probability density model 144. The probability density model 144 may be an ML model including internal operations or activation functions and corresponding parameters. The training data set 428 may be processed by the probability density model 144. The probability density model 144 may be trained to approximate a probability density function that represents a distribution of the training data set 428. Stated differently, the probability density model 144 may be trained to approximate a probability density function that represents a distribution of the success rates 508 of the provisioning flow elements 212 across time. In an example, the probability density function modeled by the probability density model 144 is based on a Gaussian KDE function. In an example, the probability density function may include a bell-shaped curve with one or more peaks. An example of a probability density function is shown by the curve 402, where the horizontal axis may represent elements of the training data set 428 (e.g., the success rates for the different provisioning flow elements 212 at the different time) and the vertical axis may represent the probability density for a given element of the training data set 428. As will be discussed more fully below, after the probability density model 144 is trained, the probability density model 144 may be used to detect anomalies at the provisioning flow elements 212. For instance, a datapoint (an outlier shown by 404) that does not fall within an expectation of the curve 402 may be considered as an anomaly. Stated differently, an outlier is a data point that is at a certain distance 406 away from the peak of the curve 402. Generally, the probability density function approximated by the probability density model 144 may have any suitable shape and/or any suitable number of peaks.

At block 430, the anomaly detection application 142 may perform model evaluation based on an output of the probability density model 144. The output of the probability density model 144 may provide an indication of an anomaly 302 at one or more of the provisioning flow elements 212. Because the input to the probability density model 144 is the success rates 508 of the provisioning flow elements 212 across time, the output of the probability density model 144 is expected to indicate no anomaly 302 at any of the provisioning flow elements 212 or at least the number of anomalies at the provisioning flow elements 212 is below a certain threshold. At block 440, based on the evaluation, the anomaly detection application 144 may perform model tuning to tune or adjust parameters of the model. In an example, the anomaly detection application 142 may adjust a probability density threshold (e.g., the distance 406) of the probability density model 144 (e.g., for determining whether an anomaly 302 is detected at one or more of the provisioning flow elements 212). In an example, the anomaly detection application 142 may adjust a bandwidth of the probability density function (e.g., the curve 402) modeled by the probability density model 144. The operations of processing the training data set 428 by the probability density model 144, the evaluating the model at block 430, and tuning the model parameters at block 440 can be repeated (shown by the arrow 402) until an error in the output of the probability density model 144 is satisfied (e.g., satisfying a certain threshold).

After the probability density model 144 is trained, the probability density model 144 may be deployed as a ground truth model in the network system 100 for detecting anomalies (outliers) at the provisioning flow elements 212. As an example, the probability density model 144 may be trained such that all data points in the training data set 428 may fit within a certain cluster, and any new data point that is outside of the boundary of the cluster may be considered as an outlier or anomaly.

During the deployment, the network provisioning application 124 may continue to provision various provisioning flows 210 and provide corresponding provisioning logs 132 to the anomaly detection application 142. To that end, the anomaly detection application 142 may determine, based on a live provisioning log 132, live metrics (e.g., successive rates 508) for the provisioning flow elements 212. The live provisioning log 132 may be captured from provisioning the provisioning flows 210 during a current time period (e.g., a short time period such as 5-10 minutes). The live provisioning log 132 may include substantially similar data fields information as the provisioning log 132 captured during training but may be captured over a significantly shorter time period. The anomaly detection application 142 may determine the live metrics using similar mechanisms as determining the metrics during training as discussed above with reference to blocks 426. The anomaly detection application 142 may process the live metrics using the probability density model 144 to determine whether an anomaly 302 is currently detected. More specifically, the output of the probability density model 144 may indicate whether an anomaly 302 is detected and/or at which of the provisioning flow element(s) 212 is the anomaly 302 detected.

Figure 6:
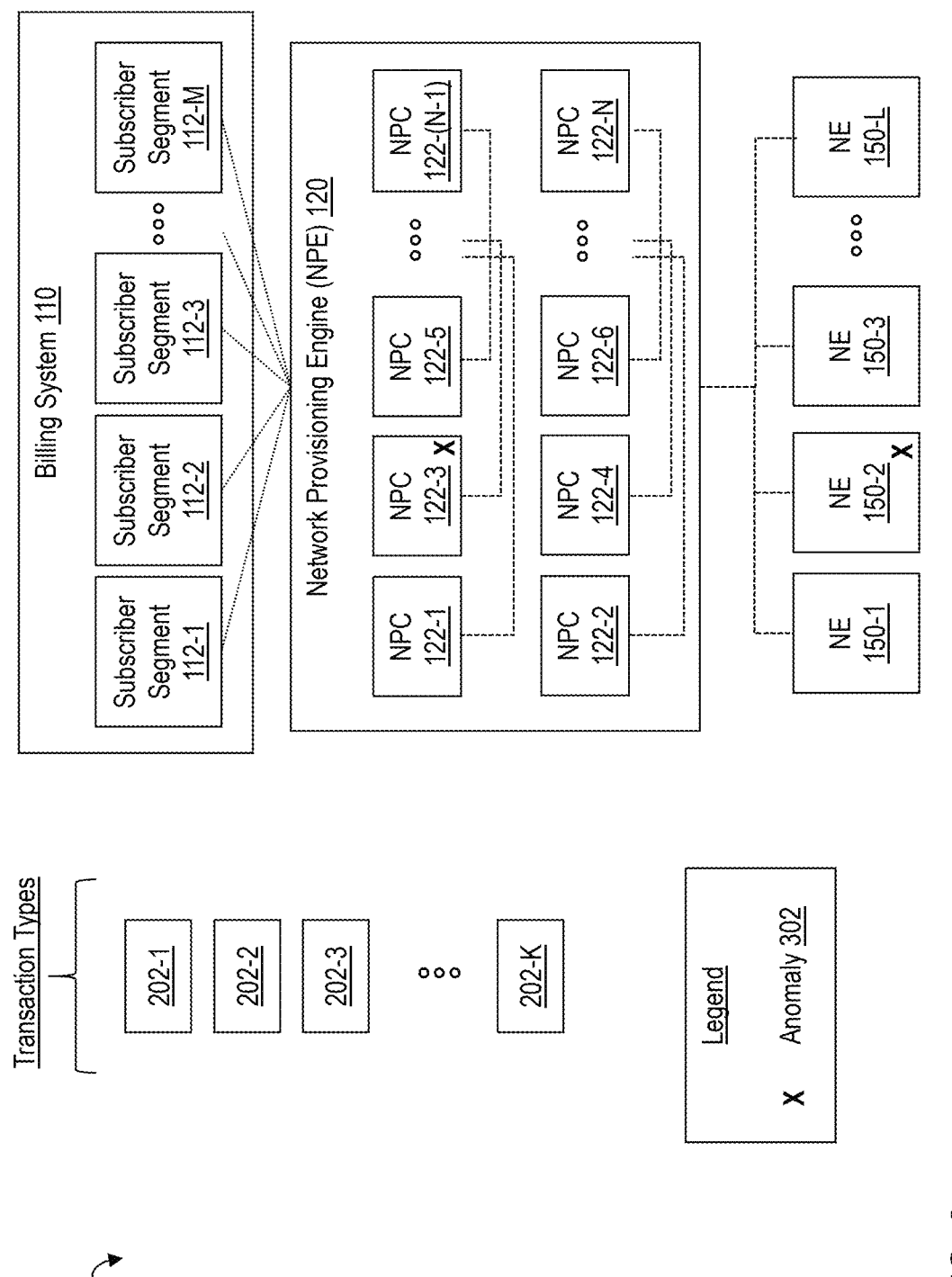
FIG. 6 is a block illustrating an example output provided by a probability density model trained to provide efficient anomaly detection in end-to-end provisioning flows according to an embodiment of the disclosure.

Turning now to FIG. 6, an example output 600 provided by the probability density model 144 trained to provide efficient anomaly detection in end-to-end provisioning flows 210 is described. FIG. 6 provides a pictorial view of an output of the trained probability density model 144 during deployment. The deployment may include various provision flows 210 provisioned based on transactions, each for a respective one of the subscriber segments 112 and associated with a respective one of the transaction types 202. Each of the provisioning flows 210 is further based on one or more respective ones of the NPCs 122 and via one or more respective ones of the NEs 150. In the illustrated example of FIG. 6, anomalies 302 are detected at the NPC 122-3 and the NE 150-2. Generally, the probability density model 144 may provide an output indicating the anomalies 302 in any suitable format (e.g., in a report, in a table, etc.).

In an embodiment, the output of the probability density model 144 may indicate multiple anomalies 302 at multiple provisioning flow elements 212, and the anomaly detection application 142 may further apply various filters to the detected anomalies 302 to determine anomalies 302 that are impacting customers, anomalies 302 that are not impacting customers, anomalies 302 that are of a high priority, anomalies 302 that are of a low priority, and/or anomalies 302 that are persistent and requires actions to be performed. A network operator may then prioritize which anomalies to be addressed first based on the filtering outputs. For instance, the network operator may prioritize anomalies that are impacting customers.

Figure 10:
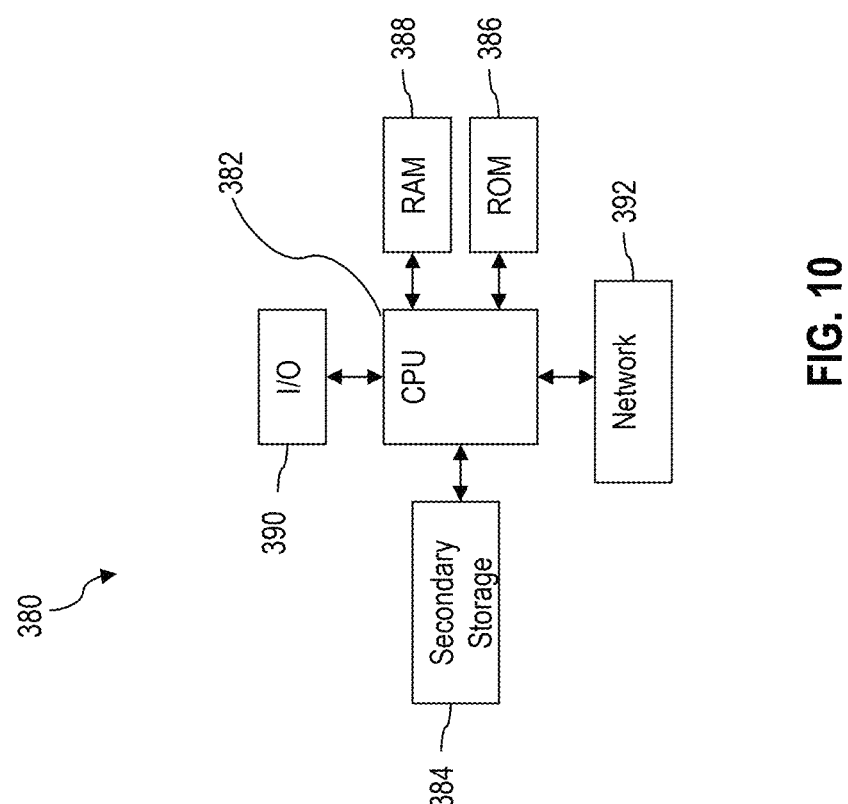
FIG. 10 is a block diagram of a computer system according to an embodiment of the disclosure.

Turning now to FIG. 7, a method 700 is described. In an embodiment, the method 700 is a method of providing anomaly detection simultaneously across elements 212 along end-to-end provisioning flows 210 in a network system 100. The method 700 may include similar mechanisms as discussed above with reference to FIGS. 1-6. In embodiments, the method 700 may be implemented using a computer system with components as shown in FIG. 10. As illustrated, FIG. 7 includes a number of enumerated operations, but embodiments of the operations in FIG. 7 may include additional operations before, after, and in between the enumerated operations. In some embodiments, one or more of the enumerated operations may be omitted or performed in a different order.

At block 702, a network provisioning application 124 implemented in a first computer system (e.g., the NPE 120) provisions a plurality of provisioning flows 210. Each of the plurality of provisioning flows 210 is based on a respective one of a plurality of transactions associated with a respective one of a plurality of transaction types 202 and a respective one of a plurality of subscriber segments 112. At block 704, as part of the provisioning, the network provisioning application 124 transmits, to a plurality of NEs 150, provisioning instructions based on a translation of the plurality of transactions. The translation may be performed based on a plurality of NPCs 122 (e.g., including CFSs, RFSSs, and LRSs). In an embodiment, the plurality of subscriber segments 112 include at least one of a prepaid service brand, a postpaid service brand, or an Internet of things (IoT) service brand. In an embodiment, the transaction types 202 are associated with at least one of a service activation, a service deactivation, a service suspension, a service restoration, a billing cycle change, a service feature change, an identity access management, a subscriber identity module (SIM) change, or a phone number change.

At block 706, an anomaly detection application 142 implemented in a second computer system (e.g., the anomaly detection computer system 140) receives a provisioning log 132 captured from provisioning respective ones of the plurality of provisioning flows 210 over a predefined time period. In some examples, the first and second computer systems correspond to the same computer system (e.g., the anomaly detection application 142 is integrated into the NPE 120). In other examples, the first and second computer systems are different computer systems. The provisioning log 132 includes operations and response codes associated with provisioning flow elements 212 along the plurality of provisioning flows 210. The provisioning flow elements 212 includes the plurality of transaction types 202, the plurality of subscriber segments 112, the plurality of NPCs 122, and the plurality of NEs 150. In an embodiment, the provisioning log 132 comprises a timestamp for each of the operations and response codes.

At block 708, the anomaly detection application 142 determines, based on the provisioning log 132, a plurality of metrics, each indicative of a success rate 508 for a respective one of the provisioning flow elements 212 in association with provisioning a respective one of the plurality of provision flows 210. In an embodiment, the plurality of metrics includes, for each of a plurality of intervals in the predefined time period, a sequence of success rates 508, each associated with a respective one of the provisioning flow elements 212 in association with provisioning respective ones of the plurality of provisioning flows 210.

At block 710, the anomaly detection application 142 determines an ML model (e.g., the probability density model 144) to approximate a probability density function of the plurality of metrics. In an embodiment, as part of determining the ML model, the anomaly detection application 142 adjusts, based on the plurality of metrics, a probability density threshold of the ML model.

At block 712, the anomaly detection application 142 determines, based on a live provisioning log 132 captured from provisioning respective ones of the plurality of provisioning flows 210 during a current time, a plurality of live metrics. Each of the live metrics is indicative of a success rate 508 for a respective one of the provisioning flow elements 212.

At block 714, the anomaly detection application 142 processes the plurality of live metrics using the ML model to detect an anomaly 302 at one or more of the provisioning flow elements 212.

At block 716, the anomaly detection application 142 triggers an action to address the detected anomaly 302. In an embodiment, the action to address the detected anomaly includes generating a dashboard including an indication of the detected anomaly 302 and errors associated with the one or more of the provisioning flow elements 212 at which the anomaly 302 is detected. Additionally or alternatively, the action to address the detected anomaly includes transmitting, by the anomaly detection application 142, to a responsible party for the detected anomaly 302, a notification of the detected anomaly 302. Additionally or alternatively, the action to address the detected anomaly includes displaying, by the anomaly detection application 142, on a displaying device, an indication of the detected anomaly 302. In an embodiment, the anomaly 302 detected at the one or more provisioning flow elements 212 includes at least a first anomaly 302 at a first provisioning flow element 212 of the provisioning flow elements 212 and a second anomaly 302 at a second provisioning flow element 212 of the provisioning flow elements 212 different than the first provisioning flow element 212. In such an embodiment, the action to address the detected anomaly 302 includes determining an error in the network system 100 based on a correlation between at least the first anomaly 302 at the first provisioning flow element and the second anomaly 302 at the second provisioning flow element.

In an embodiment, the anomaly detection application 142 further updates a parameter of the ML model based on a subsequent provisioning log 132 captured from provisioning respective ones of the plurality of provisioning flows 210 during a subsequent time period. In an embodiment, a duration of the predefined time period during which the provisioning log 132 is captured for determining the ML model is the same as a duration of the subsequent time period during which the subsequent provisioning log 132 is captured for updating the ML model. In an embodiment, at least a portion of the live provisioning log 132 used for the anomaly detection is part of the subsequent provisioning log 132 used for updating the ML model. For instance, the live provisioning log 132 may be stored at the data collection storage device 130 and collected over subsequent time period to provide the subsequent provisioning log.

Turning now to FIG. 8, a method 800 is described. In an embodiment, the method 800 is a method of training an ML model (e.g., the probability density model 144) to provide anomaly detection simultaneously across elements 212 along end-to-end provisioning flows 210 in a network system 100. The method 800 may include similar mechanisms as discussed above with reference to FIGS. 1-7. In embodiments, the method 800 may be implemented using a computer system with components as shown in FIG. 10. As illustrated, FIG. 8 includes a number of enumerated operations, but embodiments of the operations in FIG. 8 may include additional operations before, after, and in between the enumerated operations. In some embodiments, one or more of the enumerated operations may be omitted or performed in a different order.

At block 802, an application 142 implemented in a computer system 140 of the network system 100, a provisioning log 132 captured from provisioning a plurality of provisioning flows 210 over a predefined period of time. The plurality of provisioning flows 210 are based on service requests (e.g., transactions) that are associated with a plurality of transaction types 202 and a plurality of subscriber segments 112. The provisioning log 132 includes time-stamped operations and time-stamped response codes associated with elements 212 along the plurality of provisioning flows 210. The provisioning flow elements 212 include the plurality of transaction types 202, the plurality of subscriber segments 112, a plurality of NPCs including a translation of service plan features (or rate plan features) of the plurality of subscriber segments 112 into provisioning instructions for a plurality of NEs 150, and the plurality of NEs 150.

At block 804, the application 142 generates, based on the provisioning log, a training data set 428 including, for each interval of a plurality of intervals across the predefined period of time, a plurality of success rates 508, each for a respective one of the provisioning flow elements 212 in association with respective ones of the plurality of provisioning flows 210 (e.g., over the respective interval). In an embodiment, as part of generating the training data set 428, the application 142 further determines, for each of the provisioning flow elements 212 and for each interval across the predefined period of time, a number of successes and a number of failures in association with respective ones of the plurality of provisioning flows 210 based on at least one of respective ones of the time-stamped operations or respective ones of time-stamped response codes in the provisioning log 132. In an embodiment, the training data set 428 further includes, for each of the plurality of success rates 508, at least one of an indication of a date and time 502 or an hour of the day 504 associated with the respective success rate 508.

At block 806, the application 142 trains the ML model to approximate a probability density function of the training data set 428. At block 808, as part of training the ML model, the application 142 processes the training data set 428 using the ML model. In an embodiment, as part of training the ML model, the application 142 further adjusts a probability density threshold of the ML model. In an embodiment, the probability density function approximated by the ML model is based on a KDE.

At block 810, the application 142 provides the trained ML model for real-time provisioning anomaly detection in the network system 100 (e.g., as discussed above with reference to operations at blocks 712-716 of the method 700).

Turning now to FIG. 9, a method 900 is described. In an embodiment, the method 900 is a method of providing anomaly detection simultaneously across elements 212 along end-to-end provisioning flows 210. The method 900 may include similar mechanisms as discussed above with reference to FIGS. 1-8. In embodiments, the method 900 may be implemented using a computer system with components as shown in FIG. 10. As illustrated, FIG. 9 includes a number of enumerated operations, but embodiments of the operations in FIG. 9 may include additional operations before, after, and in between the enumerated operations. In some embodiments, one or more of the enumerated operations may be omitted or performed in a different order.

At block 902, an application 142 implemented in a computer system 140 of the network system 100 receives a live provisioning log 132 captured from a plurality of provisioning flows 210 during a current time period. The plurality of provisioning flows 210 are based on service requests (e.g., transactions) that are associated with a plurality of transaction types 202 and a plurality of subscriber segments 112. The provisioning log 132 includes operations and response codes associated with elements 212 along the plurality of provisioning flows 210. The provisioning flow elements 212 includes the plurality of transaction types 202, the plurality of subscriber segments 112, a plurality of NPCs 122 including a translation of service plan features of the plurality of subscriber segments 112 into provisioning instructions for a plurality of NEs 150, and the plurality of NEs 150.

At block 904, the application 142 determines, based on the live provisioning log 132, a plurality of metrics, each indicative of at least one of a provisioning success rate 508 or a provisioning failure rate for a respective one of the provisioning flow elements 212 in the current time period.

At block 906, the application 142 detects an anomaly 302 at one or more of the provisioning flow elements 212 by using a probability density model 144 to process the plurality of metrics. The probability density model 144 is trained to approximate a probability density function of at least one of provisioning success rates 508 or provisioning failure rates of the plurality provisioning flow elements 212 over a predefined time period longer than the current time period.

At block 908, the application 142 provides a notification of the detected anomaly 302 (e.g., via at least one of an email notification, a dash board, or an alert displayed on a monitoring device).

In an embodiment, the application 142 further adapts one or more parameters of the probability density model 144 repeatedly, where each of the adapting is based on a provisioning log 132 captured from a plurality of provisioning flows 210 in a most recent capturing period. For instance, the adapting is performed weekly based on a provisioning log 132 captured from provisioning flows 210 provisioned in the last month or the last 30 days.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, RAM 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, USB interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as CDMA, global system for mobile communications (GSM), LTE, WIFI (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a network system to provide efficient anomaly detection simultaneously across elements along end-to-end provisioning flows in the network system, the method comprising:

provisioning, by a network provisioning application implemented in a first computer system, a plurality of provisioning flows, each based on a respective one of a plurality of transactions associated with a respective one of a plurality of transaction types and a respective one of a plurality of subscriber segments, wherein the provisioning comprises:

transmitting, by the network provisioning application, to a plurality of network elements (NEs), provisioning instructions based on a translation of the plurality of transactions, wherein the translation is based on a plurality of network provisioning catalogs (NPCs);

receiving, by an anomaly detection application implemented in a second computer system, a provisioning log captured from provisioning respective ones of the provisioning flows over a predefined time period, wherein the provisioning log comprises operations and response codes associated with provisioning flow elements along the plurality of provisioning flows, wherein the provisioning flow elements comprise the plurality of transaction types, the plurality of subscriber segments, the plurality of NPCs, and the plurality of NEs;

determining, by the anomaly detection application, based on the provisioning log, a plurality of metrics, each indicative of a success rate for a respective one of the provisioning flow elements in association with provisioning a respective one of the plurality of provisioning flows;

determining, by the anomaly detection application, a machine learning (ML) model to approximate a probability density function of the plurality of metrics;

determining, by the anomaly detection application, an anomaly at one or more of the provisioning flow elements based on the ML model; and triggering, by the anomaly detection application, an action to address the detected anomaly.

2. The method of claim 1, wherein the plurality of subscriber segments comprise at least one of a prepaid service brand, a postpaid service brand, or an Internet of things (IoT) service brand.

3. The method of claim 1, wherein the plurality of transaction types are associated with at least one of a service activation, a service deactivation, a service suspension, a service restoration, a billing cycle change, a service feature change, an identity access management, a subscriber identity module (SIM) change, or a phone number change.

4. The method of claim 1, wherein:

the provisioning log comprises a timestamp for each of the operations and response codes, and the plurality of metrics comprise, for each of a plurality of intervals in the predefined time period, a sequence of success rates, each associated with a respective one of the provisioning flow elements in association with provisioning respective ones of the plurality of provisioning flows.

5. The method of claim 1, wherein the determining the ML model comprises:

adjusting, by the anomaly detection application, based on the plurality of metrics, a probability density threshold of the ML model.

6. The method of claim 1, wherein the determining the anomaly at the one or more provisioning flow elements comprises:

determining, by the anomaly detection application, a plurality of live metrics based on a live provisioning log captured from provisioning respective ones of the provisioning flows during a current time, each of the plurality of live metrics indicative of a success rate for a respective one of the provisioning flow elements at the current time; and processing, by the anomaly detection application, the plurality of live metrics using the ML model.

7. The method of claim 1, further comprising:

updating a parameter of the ML model based on a subsequent provisioning log captured from provisioning respective ones of the provisioning flows during a subsequent time period.

8. The method of claim 7, wherein a duration of the predefined time period during which the provisioning log is captured for determining the ML model is the same as a duration of the subsequent time period during which the subsequent provisioning log is captured for updating the ML model.

9. The method of claim 1, wherein the action to address the detected anomaly comprises:

generating a dashboard comprising an indication of the detected anomaly and errors associated with the one or more of the provisioning flow elements at which the anomaly is detected.

10. The method of claim 1, wherein the action to address the detected anomaly comprises:

transmitting, by the anomaly detection application, to a responsible party for the detected anomaly, a notification of the detected anomaly.

11. The method of claim 1, wherein the action to address the detected anomaly comprises:

displaying, by the anomaly detection application, on a displaying device, an indication of the detected anomaly.

12. The method of claim 1, wherein:

the anomaly detected at the one or more provisioning flow elements comprises:

a first anomaly at a first provisioning flow element of the provisioning flow elements; and a second anomaly at a second provisioning flow element of the provisioning flow elements different than the first provisioning flow element, and the action to address the detected anomaly comprises:

determining, by the anomaly detection application, an error in the network system based on a correlation between the first anomaly at the first provisioning flow element and the second anomaly at the second provisioning flow element.

13. The method of claim 1, wherein the ML model is trained to approximate a probability density function of a distribution of a training data set.

14. The method of claim 13, wherein the training data set comprises, for each interval of a plurality of intervals across a predetermined period of time, a plurality of success rates, each for a respective one of the provisioning flow elements in association with respective ones of the plurality of provisioning flows.

15. The method of claim 14, wherein the training data set further includes, for each of the plurality of success rates, at least one of an indication of a date and time or an hour of the day associated with the respective success rate.

16. The method of claim 13, wherein the probability density function approximated by the ML model is based on a kernel density estimation (KDE).

17. The method of claim 13, wherein the ML model is trained to approximate the probability density function of the distribution of the training data set by adjusting a threshold probability density of the ML model.

18. The method of claim 1, wherein the ML model comprises a probability density model.

19. The method of claim 18, further comprising:

adapting, by the anomaly detection application, one or more parameters of the probability density model repeatedly, wherein each of the adapting is based on a most recent provisioning log captured from provisioning flows provisioned in a most recent capturing period.

20. The method of claim 10, wherein transmitting the notification of the detected anomaly is via at least one of an email notification, a dashboard, or an alarm.

*     *     *     *     *